June 12, 1956  J. HREBICEK  2,749,784
CLOSURE REMOVER WITH PIERCING MEANS
Filed Sept. 6, 1952  2 Sheets-Sheet 1
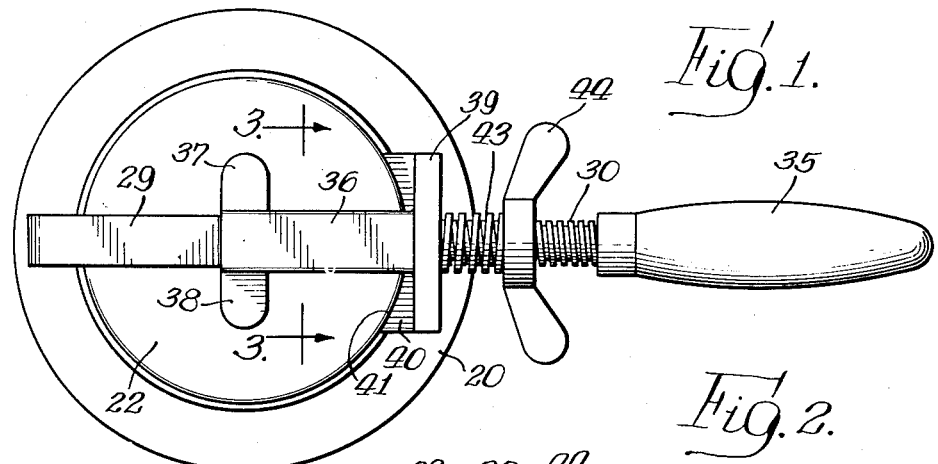
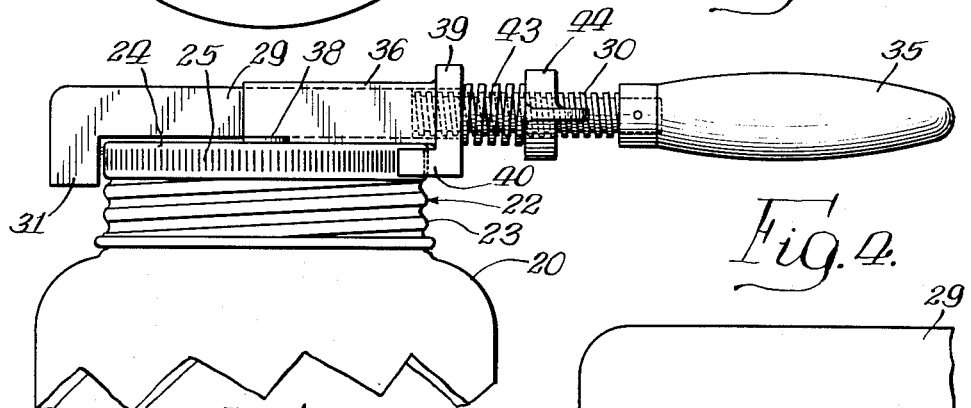
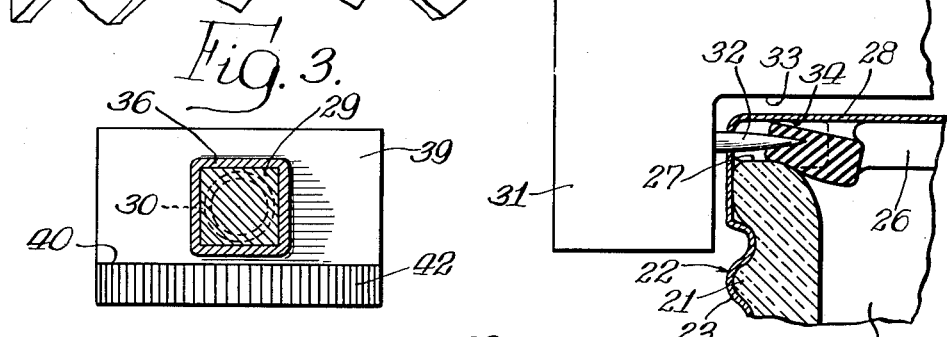
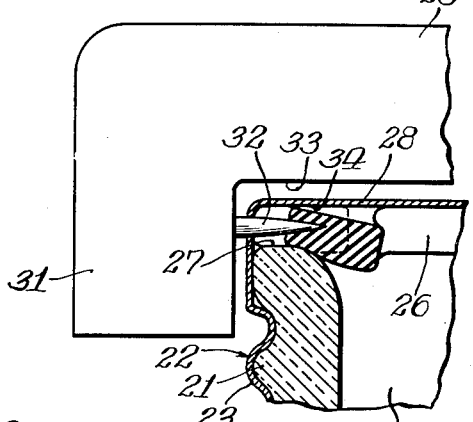
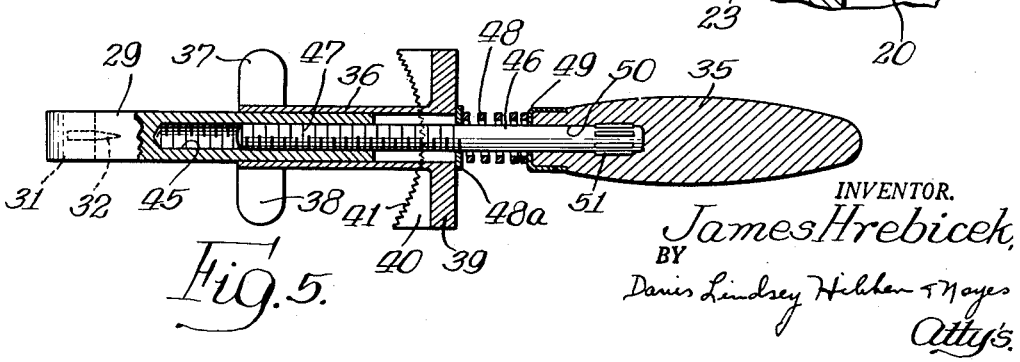
INVENTOR.
James Hrebicek,
BY
Davis Lindsey Hibben & Noyes
Atty's.

June 12, 1956 — J. HREBICEK — 2,749,784
CLOSURE REMOVER WITH PIERCING MEANS
Filed Sept. 6, 1952 — 2 Sheets-Sheet 2
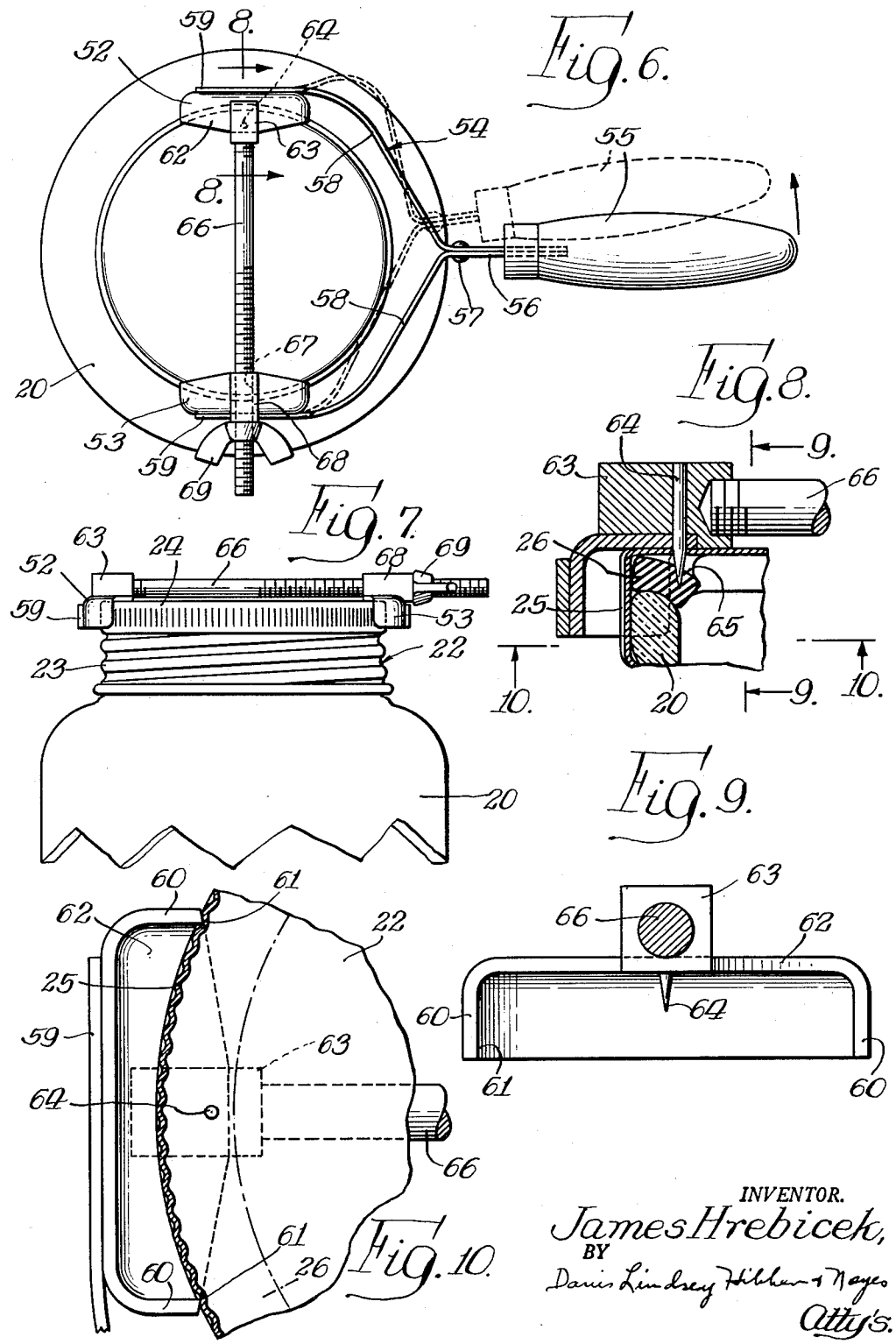

United States Patent Office 2,749,784
Patented June 12, 1956

2,749,784

CLOSURE REMOVER WITH PIERCING MEANS

James Hrebicek, Chicago, Ill.

Application September 6, 1952, Serial No. 308,196

3 Claims. (Cl. 81—3.42)

This invention relates to bottle or jar cover openers and particularly to covers of the screw type.

Food which has been prepared and stored in bottles or jars is generally stored in a slight vacuum. In the case of home canned food, the food to be preserved is generally placed in a jar with the jar cover loosely applied to the jar and the assembly is then placed in a vat or kettle which is heated until the food is deemed to be properly prepared. While the bottle or jar is still hot, the cover is screwed on tight, with the result that as the remaining air within the bottle or jar cools, a slight vacuum is created. This vacuum not only assists in preserving the food but also plays an important part in making an air-tight seal between the cover and bottle or jar.

The cover itself is generally of a thin sheet metal variety having a rubber gasket interposed between the edge of the bottle and the cover itself. The sides of the cover have a thread formed therein which mates with the thread formed on the exterior of the bottle or jar adjacent the cover. When it is desired to remove the cover, the difference in pressure on the two sides of cover, together with the friction created by the rubber gasket under such pressure renders the removal of the cover extremely difficult. The thinness of the metal used in the cover makes the cover relatively weak for the application of tools to assist in overcoming the force of friction. Furthermore, it is desirable to remove the cover in such a way that it will not be too damaged to form a substantial seal when it is replaced on the jar.

It is very generally known that once the pressure is equalized on both sides of a vacuum sealed cover, the force of friction between the rubber and cap is materially reduced, so much so that no tools are required to complete the removal of the cover.

The principal object of this invention is to provide a device for quickly and easily removing covers from jars or the like wherein the cover is held on the jar with the aid of a pressure differential between the inside and the outside of the jar.

More specifically, the object of this invention is to provide a means for first equalizing the pressure on both sides of a jar cover and then providing a mechanical means for turning the cover relative to the jar to effect the removal of the cover.

A feature of this invention is a means for equalizing the pressure on both sides of a cover for a jar, the means being so disposed that the cover may be used again and again without destroying the seal normally created between the cover and jar.

A more specific object of this invention is to provide a device for piercing a cover for a jar to admit air to the interior of the jar and thus equalize the pressure on both sides of the cover.

A still further object of this invention is to provide a means for piercing a cover for a jar wherein very little force on the part of the operator is required to effect the piercing operation.

A still further object of this invention is to provide a means for piercing a cover for a jar to equalize the pressure on both sides of the cover, the means being adjustable to include the normal range of sizes of covers generally encountered in the jars used by the housewife.

These and other objects and features of this invention will become apparent from the following detailed description when taken together with the accompanying drawings, in which Fig. 1 is a plan view of a jar, a cover on the jar, and a preferred form of cover-removing device made in accordance with this invention;

Fig. 2 is a partial side elevation of the jar cover-removing device of Fig. 1;

Fig. 3 is a section through the cover-removing device taken along line 3—3 of Fig. 1;

Fig. 4 is a fragmentary enlarged section through the jar, cover and device showing the piercing means in operation;

Fig. 5 is a section through a modification of the cover-removing device of Fig. 1;

Fig. 6 is a plan view of a jar cover and another modification of the cover-removing device of Fig. 1;

Fig. 7 is a fragmentary elevation of the jar, cover and cover-removing device of Fig. 6;

Fig. 8 is a fragmentary enlarged section taken on line 8—8 of Fig. 6 through the bottle, the cover and cover-removing device of Fig. 6 showing the piercing portion of the device in operation;

Fig. 9 is a section taken along line 9—9 of Fig. 8; and

Fig. 10 is a section taken along line 10—10 of Fig. 8.

Referring now to the drawings for a detailed description of the invention, and particularly to Figs. 1 and 2, there is shown a jar 20 which may be the usual mason jar used for canning, or any one of the bottle-type containers of various sizes in which food is normally sold in the retail stores. Said jar has a neck portion which is threaded as at 21 (Fig. 4) to receive a cover 22 made of thin gauge brass or other non-tarnishing or stainless metal. Said cover 22 is threaded along its sides as at 23 so that the cover may be screwed onto the threads 21 on the side of the neck of the jar. Around the upper periphery 24 of cover 22, the metal is serrated as at 25 to provide a means for gripping the cover when it is desired to apply the cover to or remove it from the jar.

As shown in Fig. 4, a gasket 26 of resilient flexible material such as rubber is interposed between the edge 27 of the jar and the transverse portion 28 of the cover. Under pressure, this gasket 26 takes the shape of the edge 27 of the jar and forms an air-tight seal between the cover and jar and dispenses with any fine fitting that might otherwise be required where a metal surface is to form a gas-tight seal with a glass or other hard surface. Gasket 26 is generally rectangular in radial cross-section, although the actual shape of this section is not material to this invention.

Under normal circumstances, cover 22 is held on jar 20 not only by the force of the screw action obtained by mating threads 21 and 23, but also by virtue of a pressure differential between the interior of the jar 20 and the surrounding atmosphere. This pressure differential causes cover 20 to bear against the rubber gasket 26 with considerable force so that a great deal of friction is developed between the two and between the gasket and jar which renders the removal of cover 22 without the aid of special tools extremely difficult.

It is obvious that the pressure differential could be equalized merely by piercing the cover 22 somewhere over the air space between the cover and the top of the contents of the jar. Once such an opening is formed in the cover, however, the contents of the jar are thereafter exposed to the atmosphere through the pierced opening and consequently may deteriorate rapidly. This defect is eliminated in the cover-removing device which is now to be described.

Referring to the form shown in Figs. 1 to 4, the cover-removing device is comprised of a rod 29 of rigid material, either metal or plastic, and which has formed on the right-hand end thereof, as viewed in Figs. 1 and 2, a threaded portion 30. The left-hand portion of rod 29 as viewed in Figs. 1 and 2 is bent or otherwise formed at right angles to the axis of rod 29 to constitute an abutment 31 which is adapted to fit over the serrated edge 25 of cover 22. As shown in the enlarged view in Fig. 4, a hardened needle 32 is mounted in abutment 31 on an axis generally parallel with the axis of rod 29 and with the point of said needle 32 extending toward the right as viewed in said Fig. 4. Needle 32 is thus mounted under the main portion of rod 29 and is out of the way so that there is little or no danger that the operator will be harmed by an accidental contact with the sharp point of the needle. The vertical distance of the axis of the needle from the underside 33 of rod 29 is so chosen that the needle will be in line with gasket 26 but will not be below the edge of jar 20.

It is contemplated that needle 32 will be pushed to the right as viewed in Fig. 4 to pierce the side 25 of cover 22. It is desirable, therefore, that the needle avoid contacting the jar 20 to make certain that the glass will not be chipped and contaminate the food in the container to cause bodily injury to the consumer of the contents of the jar. It is also contemplated that needle 32 will pierce cover 22 at a portion thereof which is normally in contact with gasket 26 so that when the cover is replaced on jar 20, the opening formed by the needle will be closed by the gasket and the contents of the jar may again be sealed from the atmosphere. As shown in Fig. 4, it will be observed that needle 32 will distort gasket 26 by pushing the portion of gasket 26 in contact with needle 32 radially inwardly sufficiently far to create a slight gap 34 between the cover and gasket through which outside air coming in through the opening formed by needle 32 can enter the jar to equalize the pressure on both sides of cover 22.

The means by which needle 32 is forced to the right as shown in Fig. 4 to pierce cover 22 is shown in Figs. 1 and 2. The threaded end 30 of rod 29 is secured to a handle 35 by which the device may be manipulated. Between handle 35 and abutment 31 is a slide 36 having a pair of lugs 37 and 38 formed at the left-hand end thereof as viewed in Figs. 1 and 2, and a cross-bar 39 formed in the right-hand end thereof as viewed in Figs. 1 and 2. Said cross-bar 39 is in turn formed with an abutment 40 having a concave surface 41 facing abutment 31. Said concave surface 41 is serrated as shown at 42 in Fig. 3, the serrations being adapted to contact the serrations 25 in cover 22 and thereby form a gripping means which assists in rotating cover 22 when the cover is to be removed. Between cross-bar 39 and handle 35 is a spring 42 which is compressed against cross-bar 39 by a wingnut 44 mounted on the threaded portion 30 of rod 29.

The lugs 37, 38 serve to locate slide 36 with reference to cover 22 in such manner that the serrated concave surface 41 will be aligned with the serrations 25 on the cover 22. Thus lugs 37, 38 will be made to lie in the same plane as the top surface of the cover 22 and the abutment 40 containing the concave serrated surface 41 will be made to assume a position in a plane parallel with the plane of the top surface of cover 22 so that the serrations in the concave surface 41 will be parallel with the serrations 25 on cover 22 as aforesaid to provide the necessary gripping action.

To operate the device, the user first backs wingnut 44 towards handle 35 by an amount sufficient to cause slide 36 to move to the right as viewed in Figs. 1 and 2 and permit the jar cover 22 to be inserted between the point of needle 32 and the serrated concave surface 41 of slide 36. The device is then placed over cover 22 with lugs 37, 38 contacting the outer surface of cover 22 and the point of needle 32 contacting the side of cover 22. Wingnut 44 is then advanced along threaded portion 30 until it contacts spring 43 and the advance is continued to cause slide 36 and spring 43 to move to the left as viewed in Figs. 1 and 2 until contact is established between the cover and the point of needle 32 and the serrated concave surface 41 of slide 36. At this point additional pressure is exerted on wingnut 44 to advance it against the restraining action of spring 43 with the result that pressure is exerted on needle 32 to cause it to pierce and enter cover 22. The advance of wingnut 44 is continued until needle 32 has distorted gasket 26 and allowed air to enter the interior of the jar. When this point is reached, a lateral motion is imparted to handle member 35 to turn the device and the cover 22 in a counterclockwise direction to unscrew the cover. The device is then removed from the cover merely by backing wingnut 44 to the right as viewed in Figs. 1 and 2 until the cover is free. Said cover may then be reapplied to the jar by hand until it is tight.

The device may be used with the same cover as many times as desired, although it will be found that after the cover is once removed and the pressure differential destroyed, the cover may be readily manipulated by hand.

As shown in Fig. 3, rod 29 is preferably of rectangular cross-section and slide 36 is made to conform to the configuration of rod 29 so that slide 36 will take a predetermined position relative to rod 29 at all times.

In the modification shown in Fig. 5, the wingnut 44 has been dispensed with and rod 29 has been modified by drilling and tapping an opening 45 in rod 29 into which a rod 46 secured to handle 35 may be inserted. Said rod 46 is threaded at 47 so that rotation of handle 35 causes a rotation of rod 46 and a corresponding movement of a handle 35 axially of rod 29. Slide 36 is disposed around the outer periphery of rod 29 and a spring 48 is compressed between a washer 48a adjacent slide 36 and a metallic abutment 49 on the left-hand end of handle 35 as viewed in Fig. 5. Handle 35 may be fixed to rod 46 in any suitable way such as by a force-fit between an opening 50 in handle 35 and a knurled surface 51 on the right-hand end of rod 46 as viewed in Fig. 5.

The modification shown in Fig. 5 is used in substantially the same manner as the form shown in Figs. 1 and 2 with the exception that the movement of slide 36 along rod 29 is accomplished by rotating handle 35 relative to rod 29 instead of by using a fixed handle and a wingnut.

The form shown in Figs. 6 to 10, inclusive, is somewhat less expensive than the forms shown in Figs. 1 to 5, inclusive. It also differs from the two forms just described in that the piercing action is effected in an axial direction relative to the jar and cover instead of in a radial direction. The piercing action is also effected by direct pressure of the user rather than with the aid of a screw-threaded device. Thus the device in Figs. 6 to 10 is comprised of a pair of gripping devices 52, 53, each of which is secured to the ends of a flexible resilient fork 54 having a handle 55 fixed thereon. Said fork 54 is comprised of substantially identical flat springs having contiguous portions 56 fastened together by a rivet 57, and diverging portions 58 having end portions 59 which are substantially parallel to one another. Said parallel portions 59 are secured to grip members 52, 53 by spot welding, brazing or other suitable means. Each grip means 52, 53 is preferably comprised of a stamping having inwardly directed sides 60 (Fig. 10) with relatively sharp edges 61 designed to enter the serrations 25 on cover 22. Said sides 60 are joined by a web 62 to the outside surface of which is secured a block 63 of metal by a welding or brazing operation. Said block 63 supports thereon a needle 64 (Figs. 8 and 9), the axis of which is located a distance from the interior of the grip device 52 which is such that said needle 64 will not contact the edge of jar 20 but will contact the flat outer surface 65 of gasket 26. A threaded rod 66 is secured to block 62 and passes through an opening 67 in a corresponding block 68 on the opposite grip means 53. Rod 66 is free to slide within said opening 67. A wingnut 69 is threaded over the free end of rod 66 and is used to adjust the spacing between grip means 52, 53 to the diameter of the cover to be removed.

The cover-removing device shown in Figs. 6 to 10 is utilized to remove cover 22 by holding grip means 52 against the side of cover 22 and then pushing down on block 63 secured to web portion 62 until needle 64 pierces cover 22 and web 62 is substantially in contact with the top of said cover 22. The opposite grip means 53, being held away from grip means 52 by the resilience of the spring portions 58, is then advanced towards grip means 52 by means of wingnut 69 until a firm clamping action is secured between said grip means 52 and 53. Handle 55 is then turned counterclockwise as shown by the arrow in Fig. 6 relative to jar 20 and cover 22 is unscrewed from the jar. In piercing cover 22, needle 64 allows air to enter between gasket 26 and cover 22 to equalize the pressure on both sides of said cover. After this, the turning effort required to remove cover 22 is very slight so that despite the fact that fork 54 is made of flat spring pieces, said fork is not unduly distorted when the cover is removed. Furthermore, the distortion is limited by one of the arms 58 contacting the serrated side of cover 22.

It is understood that the materials from which the devices hereinabove are made may vary in accordance with the price at which the devices are to be sold. Thus, certain portions may be made of plastic, or may be stamped instead of machined, or may be made with inserts for withstanding certain concentrated pressures. The proportions of the various parts of the devices may likewise be varied without departing from the scope of this invention. It is understood, therefore, that the scope of this invention is not to be limited by the foregoing disclosure but is to be determined by the appended claims.

What is claimed is:

1. A device for loosening closure caps from bottles, jars or the like, having a resilient gasket between the cap and bottle or jar, said device comprising a rod, an abutment secured to the rod, piercing means secured to the rod and disposed with the axis of said piercing means disposed substantially parallel with the axis of said cap and adjacent said gasket, said piercing means being adapted to project into the interior of the cap to displace the gasket and provide a vent by which pressure is equalized on the inside and outside of the cap, an abutment freely slidable on the rod, screw means for advancing the slidable abutment toward the first-mentioned abutment to clamp the cap between said abutments, a handle, and flexible means connecting each abutment to the handle.

2. A device as described in claim 1, said abutments each comprising a plate having flanges extending in the direction of the piercing means and terminating in relatively sharp edges extending parallel with the axis of the cap, and said cap having a corrugated rim adapted to be engaged by the said edges.

3. A device as described in claim 1, said abutments each comprising a plate overlying the edge region of the cap and terminating in connected side and end flanges disposed in planes parallel with the axis of the cap, said end flanges having relatively sharp edges extending parallel with the axis of the cap, and said cap having a corrugated rim adapted to be engaged by the said edges.

References Cited in the file of this patent
UNITED STATES PATENTS

| | | |
|---|---|---|
| 1,493,389 | Rosenfield | May 6, 1924 |
| 1,604,687 | Fehr | Oct. 26, 1926 |
| 2,458,806 | Tippett | Jan. 11, 1949 |
| 2,586,214 | Fay | Feb. 19, 1952 |

FOREIGN PATENTS

| | | |
|---|---|---|
| 314,381 | Germany | Sept. 16, 1919 |